United States Patent Office 3,636,063
Patented Jan. 18, 1972

3,636,063
6-METHYL-1,3,10,11-TETRAHYDROXYNAPH-
THACENE-2-CARBOXAMIDE-5,12-QUINONE
Jerry Robert Daniel McCormick, Spring Valley, and
Nancy Hazlett Arnold, Pearl River, N.Y., assignors to
American Cyanamid Company, Stamford, Conn.
No Drawing. Filed Aug. 19, 1969, Ser. No. 851,487
Int. Cl. C07c 103/26
U.S. Cl. 260—365                        1 Claim

ABSTRACT OF THE DISCLOSURE

This disclosure describes 6-methyl-1,3,10,11-tetrahydroxynaphthacene - 2 - carboxamide - 5,12 - quinone useful as an intermediate for the preparation of 6-methyl-1,3,10,11,12-pentahydroxynaphthacene-2-carboxamide.

BRIEF SUMMARY OF THE INVENTION

This invention relates to 6-methyl-1,3,10,11-tetrahydroxynaphthacene - 2 - carboxamide - 5,12 - quinone which may be represented by the following structural formula:

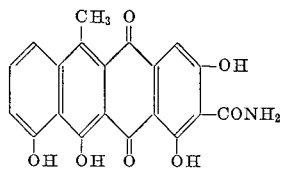

DETAILED DESCRIPTION OF THE INVENTION

The novel compound of the present invention is useful as an intermediate in the synthesis of 6-methyl-1,3,10,11,12-pentahydroxynaphthacene - 2 - carboxamide as illustrated in the following reaction scheme:

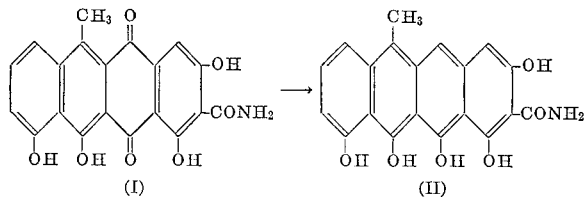

Reduction of the naphthacene - 5,12 - quinone (I) to the 5-deoxygenated derivative (II) may be readily accomplished by any of several well-known procedures described in the chemical literature for the reduction of 1-hydroxyanthraquinones to the corresponding 9-anthrones. For example, this reduction may be accomplished with boiling hydriodic acid, with tin and hydrochloric acid, or by catalytic hydrogenation with a nickel or noble metal catalyst. Preferably, the reduction is carried out in refluxing HI-phenol whereby the 6-methyl-1,3,10,11,12-pentahydroxynaphthacene - 2 - carboxamide (II) is obtained in good yield. The 6-methyl - 1,3,10,11,12 - pentahydroxynaphthacene-2-carboxamide (II) may be readily transformed to physiologically active antibiotics of the tetracycline series as is set forth in greater detail in U.S. Pat. No. 3,226,305 to McCormick et al.

The invention will be more particularly illustrated by means of the following specific examples.

EXAMPLE 1

Preparation of 2-formyl-3,5-dihydroxyterephthalic acid, dimethyl ester

A 500 ml. round-bottom flask is set up in the hood with a reflux condenser, magnetic stirrer and an ice bath. A CaCl$_2$ drying tube is attached to the top of the condenser. In order, 5 g. (0.022 mole) of 2,6-dihydroxyterephthalic acid, dimethyl ester [Monatshefte 50, 219 (1928)], 45 ml. of diethyl ether, a cold solution of 23.8 g. (0.179 mole) of AlCl$_3$ in 90 ml. of diethyl ether, and 7.14 ml. (0.185 mole) of cold liquid HCN are added to the flask. The ice bath is removed and the reaction mixture is refluxed for about an hour. Then, 14.3 g. (0.392 mole) of anhydrous HCl is dissolved in 85 ml. of cold diethyl ether and is added slowly (15 minutes) to the reaction mixture through the condenser, and refluxing is continued for 3 more hours. After cooling in an ice bath, the reaction is quenched by the careful addition of 360 ml. of 1 N HCl. The solution is then heated on the steam bath in the hood until the ether and excess HCN have evaporated and the temperature reaches 70°–75° C. After cooling again, the product is extracted with 800 ml. of diethyl ether. The ether extract is washed with 80 ml. of water and then extracted 3 times with 150 ml. of 5% NaHCO$_3$ solution. The NaHCO$_3$ extract is acidified with 25 ml. of concentrated HCl. The tan crystalline product is removed by filtration, washed with 0.1 N HCl, and dried. Yield is about 3 g. (50–55%) with melting point about 120° C. Recrystallization from hot methanol provides product with melting point at 126°–127° C.

EXAMPLE 2

Preparation of 2-formyl-3,5-dimethoxyterephthalic acid, dimethyl ester

In a one liter, 3-neck, round-bottom flask fitted with a mechanical stirrer, dropping funnel and condenser are placed 650 ml. of toluene and 38 g. (0.275 mole) of special milled and dried K$_2$CO$_3$. About 75 ml. of toluene is distilled off to remove any water from the reagents. In the dropping funnel is placed a solution of 5.25 ml. (0.055 mole) of dimethyl sulfate in 25 ml. of freshly distilled toluene, and 7 g. (0.0275 mole) of 2-formyl-3,5-dihydroxyterephthalic acid, dimethyl ester and 2 ml. of the dimethyl sulfate solution are added to the stirring mixture. Refluxing is started, the rest of the dimethyl sulfate solution is added dropwise over the next two hours, and refluxing is continued for two more hours. The slurry is cooled and filtered, the filter cake is washed with fresh toluene, and the combined filtrate and washing is evaporated to an oil, 6.2 g. The oil is taken up in 5 ml. of methanol, seeded and aged in the freezer. The yellow crystalline product is removed by filtration, washed with cold methanol and dried giving 4.038 g. (52% yield) of product, M.P. 90–93° C. Recrystallization from hot methanol raises the melting point to 93°–95° C.

EXAMPLE 3

Preparation of 2-[(1-hydroxy-8-methoxy-4-methyl-2-naphthyl) hydroxymethyl]-3,5-dimethoxyterephthalic acid, methyl ester, γ-lactone 2.25 g. (12 m. moles) of 8-methoxy-4-methyl-1-naphthol and 3.37 g. (12 m. moles) of 2-formyl-3,5-dimethoxyterephthalic acid, dimethyl ester were dissolved in a solution of 240 ml. of acetic acid and 24 ml. of conc. H$_2$SO$_4$ and let stand at room temperature in the dark for two and one-half hours. The red solution was poured into 1400 ml. of water and extracted four times with 100 ml. of toluene. The toluene was washed with 150 ml. of 5% NaHCO$_3$ and twice with 50 ml. of water. The toluene phase was concentrated to ¼ volume and used in the next step without further purification. A crude, crystalline sample of the 2-[(1-hydroxy-8-methoxy-4-methyl-2-naphthyl) hydroxymethyl]-3,5-dimethoxyterephthlic acid, methyl ester, γ-lactone, was obtained by evaporation of an aliquot of the toluene solution, and the weight yield for the condensation was calculated to be 94% of theory. The product was light colored when isolated but was unstable and quickly took on a red color.

EXAMPLE 4

Preparation of 2-[(1-,8-dimethoxy-4-methyl-2-naphthyl) hydroxymethyl]-3,5-dimethoxyterephthalic acid, methyl ester, γ-lactone 13.6 g. (100 m. moles) of $K_2CO_3$ and 550 ml. of toluene were placed in a 1 liter, 3-neck, round-bottom flask fitted with a mechanical stirrer. About 100 ml. of toluene was distilled off to remove water from the reagents. 4.68 ml. (50 m. moles) of $(CH_3)_2SO_4$ was diluted with 25 ml. of dry toluene in a dropping funnel. 4.3 g. (10 m. moles) of 2-[(1-hydroxy-8-methoxy-4-methyl-2-naphthyl) hydroxymethyl]-3,5-dimethoxyterephthalic acid, methyl ester, γ-lactone in 100 ml. of toluene (partially crystallized) and 5 ml. of the $(CH_3)_2SO_4$ solution were added to the stirring mixture. Refluxing was started and the rest of the $(CH_3)_2SO_4$ was added dropwise over the next four hours. The methylation was followed by UV (1 N KOH/methanol) and progressed very slowly. A water separator was added to the system. Intermittently over a two week period eight 13.6 g. portions of $K_2CO_3$ and nine 4.68 ml. portions of $(CH_3)_2SO_4$ were added. UV curves finally indicated complete loss of starting material. The reaction mixture was filtered and the toluene was washed with dilute $NH_4OH$ and water and evaporated to a yellow-green, crystalline residue. This was dissolved in 30 ml. of warm $CH_2Cl_2$ and diluted with 75 ml. of methanol. The light yellow, crystalline product, 2-[(1,8-dimethoxy-4-methyl-2-naphthyl) hydroxymethyl]-3,5-dimethoxyterephthalic acid, methyl ester, γ-lactone, was separated giving 646 mg. (14% yield), M.P. 260°–265° C. An additional 269 mg. (6%) of 2-[(1,8-dimethoxy-4-methyl-2-naphthyl)hydroxymethyl]-3,5-dimethoxyterephthalic acid, methyl ester, γ-lactone was obtained from the mother liquor, which was then dried to a residue, 2.87 g. This residue appeared to be a 2–3 component mixture, containing no phthalide, and no further product could be isolated from it. Repeated recrystallization of 2-[(1,8-dimethoxy-4-methyl-2-naphthyl) hydroxymethyl]-3,5-dimethoxyterephthalic acid, methyl ester, γ-lactone from $CH_2Cl_2$: methanol (2:5) gave a white product of M.P. 269°–271° C.

EXAMPLE 5

Preparation of 2-[(1,8-dimethoxy-4-methyl-2-naphthyl) hydroxy-methyl]-3,5-dimethoxyterephthalic acid, γ-lactone 823 mg. of 2-[(1,8-dimethoxy-4-methyl-2-naphthyl) hydroxymethyl]-3,5-dimethoxyterephthalic acid, methyl ester, γ-lactone was boiled with 20 ml. of 2 N NaOH+70 ml. of methanol. Some insoluble matter was separated. The solution was boiled until the methanol was removed. The alkaline mixture was acidified with 7 ml. of 6 N HCl, extracted with $CHCl_3$, and the $CHCl_3$ was dried to a tan, crystalline residue, 759 mg. (95% yield) of 2-[(1-,8-dimethoxy - 4-methyl-2-naphthyl) hydroxymethyl]-3,5-dimethoxyterephthalic acid, γ-lactone, M.P. 259°–260° C. d. Recrystalllization from acetic acid gave white crystals, M.P. 272°–274° C. d.

EXAMPLE 6

Preparation of 4-(chloroformyl)-2-[(1-,8-dimethoxy-4-methyl - 2-naphthyl) hydroxymethyl]-3,5-dimethoxybenzoic acid, γ-lactone 709 mg. (1.6 m. mole) of 2-[(1,8-dimethoxy-4-methyl-2-naphthyl) hydroxymethyl]-3,5-dimethoxyterephthalic acid, γ-lactone was mixed with 10 ml. of $CHCl_3$ and one drop of dimethylformamide and 2 ml. (23.4 m. moles) of oxalyl chloride. The bubbling subsided and everything dissolved in about ten minutes. The solution was evaporated rapidly to dryness in vacuo. The 4-(chloroformyl)-2-[(1,8-dimethoxy-4-methyl-2-naphthyl) hydroxymethyl]-3,5-dimethoxybenzoic acid, γ-lactone was used directly in the next step without characterization.

EXAMPLE 7

Preparation of 2-[(1-,8-dimethoxy-4-methyl-2-naphthyl) hydroxymethyl]-3,5-dimethoxyterephthalamic acid, γ-lactone The 4-(chloroformyl)-2-[(1,8-dimethoxy-4-methyl-2-naphthyl) hydroxymethyl]-3,5-dimethoxybenzoic acid, γ-lactone, which was prepared from 709 mg. of the 2-[(1,8-dimethoxy-4-methyl-2-naphthyl) hydroxymethyl]-3,5-dimethoxyterephthalic acid, γ-lactone, was dissolved in 4 ml. of $CH_2Cl_2$. 8 ml. of $NH_4OH$ was mixed with 38 ml. of ether in an ice bath, and 30 ml. of the cold ether layer was added to the $CH_2Cl_2$ solution of 4-(chloroformyl)-2-[(1,8-dimethoxy-4-methyl-2-naphthyl) hydroxymethyl]-3,5-dimethoxybenzoic acid, γ-lactone. A tan, crystalline precipitate formed at once. After 15 minutes at room temperature, the solvents were evaporated. The product was washed with 25 ml. of 2.5% $NaHCO_3$, filtered, washed with water, and dried giving 702 mg. (99% yield) of 2-[(1,8-dimethoxy-4-methyl-2-naphhyl) hydroxymethyl]-3,5-dimethoxyterephthalamic caid, γ-lactone, M.P. 273°–278° C. This crude product was washed with ethyl acetate to give a yellow product, M.P. 279°–286° C., which was used in the next step. Recrystallization of a portion from acetic acid gave a white product, M.P. 285°–300° C. dec.

EXAMPLE 8

Preparation of 2-(1-hydroxy-8-methoxy-4-methyl-2-naphthoyl)-3,5-dimethoxyterephthalmic acid 200 mg. (0.46 m. mole) of 2-[(1,8-dimethoxy-4-methyl-2-naphthyl) hydroxymethyl]-3,5-dimethoxyterephthalamic acid. γ-lactone was mixed with 40 ml. of t-butanol and heated at reflux under a stream of oxygen. A hot solution of 2 g. (18 m. moles) of potassium t-butoxide in 60 ml. of t-butanol was added. Everything dissolved. The solution was refluxed for one and one-half hours, diluted with 100 ml. of tetramethylurea, and refluxed for five more hours. The reaction was quenched with 700 ml. of 0.1 N HCl, extracted with $CHCl_3$, and the $CHCl_3$ was extracted with 40 ml. of 2.5% $NaHCO_3$ and three times with 25 ml. of water. The aqueous extract was acidified with HCl, filtered, and dried giving 100 mg. (50% yield) of yellow, crystalline product, M.P. 263°–265° C.

EXAMPLE 9

Preparation of 5,12-dihydro-1,3,10,11-tetrahydroxy-6-methyl-5,12-dioxo-2-naphthacenecarboxamide 5 ml. of an $AlBr_3$-$CS_3$ solution was evaporated to dryness, giving 2.5 g. of $AlBr_3$. 50 mg. of impure 2-(1-hydroxy - 8-methoxy-4-methyl-2-naphthoyl)-3,5-dimethoxyterephthalamic acid was added to the $AlBr_3$ and heated at 150° C. for 30 minutes. The reaction was quenched cautiously with 30 ml. of 6 N HCl, heated on the steam bath for 15 minutes, centrifuged, and decanted. After washing with 0.1 N HCl, the solid product was dissolved in 6 ml. of water containing 0.5 ml. triethylamine and extracted with methylisobutyl ketone. The methylisobutyl ketone was washed with triethylamine-$H_2O$ and extracted with 0.1 N NaOH. The alkaline extract was acidified with HCl in the presence of 20 ml. of $CHCl_3$. UV assay of the red $CHCl_3$ solution showed 308γ (0.6% yield) of 5,12-dihydro - 1,3,10,11 - tetrahydroxy-6-methyl-5,12-dioxo-2-naphthacenecarboxamide. This $CHCl_3$ solution, in combination with others, was washed with 1% $NaHCO_3$ and extracted with 0.01 N NaOH. The alkaline solution was slowly acidified in the presence of acetic acid vapors, producing dark red, crystalline 5,12-dihydro-1,3,10,11-tetrahydroxy - 6-methyl-5,12-dioxo-2-naphthacenecarboxamide. Additional 5,12-dihydro-1,3,10,11-tetrahydroxy-6-methyl - 5,12 - dioxo-2-naphthacenecarboxamide was prepared in 2% yield by applying the same $AlBr_3$ procedure to a solid material obtained by acidification of the "spent" triethylamine-$H_2O$ solution. Another 2% yield was obtained by repeating the recycling a second time.

EXAMPLE 10

Preparation of 6-methyl-1,3,10,11,12-pentahydroxy-naphthacene-2-carboxamide 8 mg. of 5,12-dihydro-1,3,10,11-tetrahydroxy-6-methyl-5,12-dioxo-2-naphthacenecarboxamide was mixed with 0.8 ml. of p-chlorophenol, 0.8 ml. of HI, and a drop of $H_3PO_2$ and heated at 115° C. for one and one-half hours. Crystallization occurred upon cooling. The whole reaction mixture was diluted with water, and the solid was separated, washed, and dried giving 4 mg. of tan, crystalline 1,3,10,11,12-pentahydroxy-6-methyl-2-naphthacenecarboxamide.

EXAMPLE 11

Preparation of 6-methyl-1,3,10,11,12-pentahydroxy-naphthacene-2-carboxamide acetate Three grams of 6-methyl-1,3,10,11,12-pentahydroxy-naphthacene-2-carboxamide was suspended in 18 ml. of acetic anhydride and 18 ml. of pyridine was added slowly while cooling. The mixture was heated to reflux temperature and everything dissolved. After holding at 100° C. for 45 minutes, it was cooled and washed three times with 90 ml. of petroleum ether. The viscous, gummy layer was converted to granular solid by addition of 270 ml. of ether and stirring. The solid product was filtered, washed with water and ether, and dried giving 3.7 g. (95% yield as triacetate) of brown, partially crystalline product. It was used in the next step without purification.

EXAMPLE 12

Preparation of 6-methyl-1,3,10,11-tetrahydroxy-naphthacene-2-carboxamide-5,12-quinone 500 mg. of the acetate mixture from Example 11 was dissolved in 130 ml. of acetic acid. 500 mg. of $CrO_3$ (4-fold excess) was dissolved in 0.35 ml. of water and diluted to 20 ml. with acetic acid. The two solutions were combined, allowed to stand at room temperature for 10 minutes, quenched with 500 ml. of water, and extracted with a total of 500 ml. of chloroform. The chloroform extract was washed with 250 ml. of water and 250 ml. of 5% sodium bicarbonate. The chloroform extract was itself extracted with 30 ml. of 2 N NaOH with vigorous stirring and heating to reflux for 15 minutes. The dark, aqueous phase was carefully acidified with 5 ml. of conc. hydrochloric acid. The solid product was separated by centrifugation, washed with 0.1 N HCl, and dissolved in 7 ml. of 0.1 N NaOH. The alkaline solution was made approximately 4 N by addition of 2 ml. of NaOH (50% w./w.). After five hours at room temperature, the mixture was centrifuged, the brown supernate was decanted, and the purple solid was washed three times with 2 N NaOH. The solid was suspended in 8 ml. of 0.1 N HCl plus sufficient conc. HCl to make the mixture acidic. After standing over the weekend, the solid product was separated, washed with water, and dried giving 48 mg. (13% yield) of crude quinone. The product did not appear to be crystalline. It was dissolved in increments of dimethylformamide-magnesium acetate (5 mg.

$Mg(OAc)_2$ per ml. DMF) totaling 14 ml. and filtered. The purple filtrate was acidified by the dropwise addition of hydrochloric acid in dimethylformamide (0.085 ml. conc. HCl per 100 ml. DMF) while mixing and heating on the steam bath. Crystallization began at about 7 ml., and 8.9 ml. of HCl/DMF was added in all. After standing overnight at room temperature, the product was separated, washed with 0.5 ml. of dimethylformamide and with water, and dried giving 35 mg. of purple-brown needles, M.P. 360–365° C. dec.

What is claimed is:

1. The compound 6 - methyl - 1,3,10,11 - tetrahydroxy-naphthacene-2-carboxamide-5,12-quinone represented by the formula:

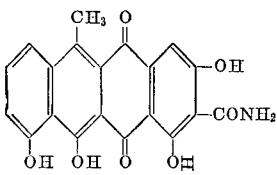

References Cited

FOREIGN PATENTS 154,168    4/1932    Switzerland _____ 260—365

OTHER REFERENCES

Olah, Friedel-Crafts and Related Reactions, vol. 2, part 2, pp. 992–993 (1964).

LORRAINE A. WEINBERGER, Primary Examiner

E. J. SKELLY, Assistant Examiner

U.S. Cl. X.R.

260—343.3, 473 R, 517, 559 AT, 559 R, 999